United States Patent
Kim et al.

(10) Patent No.: US 10,984,918 B2
(45) Date of Patent: Apr. 20, 2021

(54) MECHANICAL DECLADDER FOR SPENT NUCLEAR ROD-CUTS

(71) Applicant: Korea Atomic Energy Research Institute, Daejeon (KR)

(72) Inventors: Young-Hwan Kim, Daejeon (KR); Young-Soon Lee, Daejeon (KR); Yung-Zun Cho, Daejeon (KR); Jin-Mok Hur, Seoul (KR)

(73) Assignee: Korea Atomic Energy Research Institute, Daejeon (KR)

( * ) Notice: Subject to any disclaimer, the term of this patent is extended or adjusted under 35 U.S.C. 154(b) by 0 days.

(21) Appl. No.: 16/734,141

(22) Filed: Jan. 3, 2020

(65) Prior Publication Data

US 2020/0343008 A1 Oct. 29, 2020

(30) Foreign Application Priority Data

Apr. 24, 2019 (KR) .................. 10-2019-0047985

(51) Int. Cl.
*G21C 19/37* (2006.01)
(52) U.S. Cl.
CPC .................. *G21C 19/37* (2013.01)
(58) Field of Classification Search
CPC ...... G21C 19/37; G21C 19/065; G21C 19/18; G21C 19/19; G21C 19/34; G21C 19/36; G21C 19/365; G21C 3/3213; G21C 19/04; G21C 19/06; A01D 87/127; A01D 2087/128; A01F 29/005; B65B 69/0008; B65B 69/0025; B65B 69/0033; B65B 69/0041; B65B 69/0058; H05K 13/0419; B23D 21/02; B23Q 5/385
USPC ............. 414/412; 222/80, 81, 85, 86, 87, 88
See application file for complete search history.

(56) References Cited

U.S. PATENT DOCUMENTS

| 3,052,142 A * | 9/1962 | Simon | B23D 21/14 |
| | | | 82/54 |
| 3,827,579 A * | 8/1974 | Kendall | G21C 19/36 |
| | | | 29/723 |
| 2014/0150515 A1* | 6/2014 | Cho | G21C 19/37 |
| | | | 72/255 |

FOREIGN PATENT DOCUMENTS

| KR | 10-1680139 B | 11/2016 |
| KR | 10-1719619 B | 3/2017 |
| KR | 10-1778580 B | 9/2017 |

(Continued)

OTHER PUBLICATIONS

Korean Intellectual Property Office, "Office Action," dated Aug. 26, 2020 in connection with Korean Patent Application No. 9-5-2020-058558661, 7 pages (including English language summary of Office Action).

*Primary Examiner* — Glenn F Myers
(74) *Attorney, Agent, or Firm* — Hanley, Flight & Zimmerman, LLC (57) ABSTRACT

A mechanical decladder for a spent nuclear fuel rod-cut includes an opening and closing unit configured to open and close an outlet of a basket into which the nuclear fuel rod-cut is loaded, a supporter on which the nuclear fuel rod-cut discharged from the outlet of the basket is seated, a hydraulic cylinder module configured to move the nuclear fuel rod-cut seated on the supporter; and a cutting module for slitting the nuclear fuel rod-cut while the nuclear fuel rod-cut is being moved by the hydraulic cylinder module. The opening and closing unit opens and closes the outlet of the basket in conjunction with a movement of the hydraulic cylinder module.

9 Claims, 5 Drawing Sheets

(56) References Cited

FOREIGN PATENT DOCUMENTS

KR 101778580 B1 * 9/2017

* cited by examiner

MECHANICAL DECLADDER FOR SPENT NUCLEAR ROD-CUTS

FIELD OF THE INVENTION

The present invention relates to a mechanical decladder for spent nuclear rod-cuts, and more particularly, to a mechanical decladder which can perform a continuous slitting and decladding for a large amount of spent nuclear fuel rod-cuts.

BACKGROUND OF THE INVENTION

A nuclear fuel used for a nuclear power generation is supplied to a nuclear power plant in the form of nuclear fuel rods. The nuclear fuel rod is formed by linearly arranging a plurality of pellets in a cladding tube having a receiving space formed therein.

These fuel rods are supplied to the nuclear power plant in the form of a bundle, and the spent nuclear fuel rod assemblies that have been gone through a fission reaction stored in a water tank. As a cumulative amount of these spent fuel rods is enormous, it grows a need to deal with them. Thus, a technology has been developed to cut away and dislodge the cladding tubes and separate the nuclear fuel accommodated in the cladding tube to permanently dispose of or recycle it. To this end, a mechanical decladder for a spent nuclear fuel rod-cut has been proposed to recover the nuclear fuel materials by slitting the cladding tube of the spent nuclear fuel rod-cut (see, e.g., Korean Patent Registration No. 10-1778580).

In the types of the mechanical decladder for the spent nuclear fuel rod-cut, there are a vertical type mechanical decladder which slits the spent nuclear fuel rod-cut in a vertical direction by vertically feeding the spent nuclear fuel rod-cut, a horizontal type mechanical decladder which slits the spent nuclear fuel rod-cut in a horizontal direction by horizontally feeding the spent nuclear fuel rod-cut, and a slant type mechanical decladder which slits the spent nuclear fuel rod-cut in an inclined direction by obliquely feeding the spent nuclear fuel rod-cut.

Recently, there has been a need for the mechanical decladder having a structure capable of preventing debris generated during slitting the cladding tube from being accumulated in a cutting module while avoiding scattering of the debris, while continuously feeding the spent nuclear fuel rod-cuts.

SUMMARY OF THE INVENTION

Embodiments of the present disclosure are to provide a mechanical decladder for a spent nuclear fuel rod-cut having a structure capable of preventing scattering of debris generated during cutting a cladding tube, protecting durability of a blade, and avoiding the debris from accumulating in a cutting module, when continuously supplying the spent nuclear fuel rod-cuts.

In accordance with an aspect of the present invention, there is provided, a mechanical decladder for a spent nuclear fuel rod-cut, including: an opening and closing unit configured to open and close an outlet of a basket into which the nuclear fuel rod-cut is loaded; a supporter on which the nuclear fuel rod-cut discharged from the outlet of the basket is seated; a hydraulic cylinder module configured to move the nuclear fuel rod-cut seated on the supporter; and a cutting module for slitting the nuclear fuel rod-cut while the nuclear fuel rod-cut is being moved by the hydraulic cylinder module, wherein the opening and closing unit opens and closes the outlet of the basket in conjunction with a movement of the hydraulic cylinder module.

The mechanical decladder for the spent nuclear fuel rod-cut according to embodiments of the present disclosure has effects capable of protecting durability of a blade during cutting a cladding tube, preventing scattering of generated debris, and also avoiding the debris from accumulating in the cutting module, when continuously supplying the spent nuclear fuel rod-cuts.

BRIEF DESCRIPTION OF THE DRAWINGS

The objects and features of the present disclosure will become apparent from the following description of embodiments, given in conjunction with the accompanying drawings, in which.

DETAILED DESCRIPTION OF THE EMBODIMENTS

Hereinafter, configurations and operations of embodiments will be described in detail with reference to the accompanying drawings.

In describing the embodiments of the present disclosure, the detailed descriptions of well-known functions or configurations will be omitted if it is determined that the detailed descriptions of well-known functions or configurations may unnecessarily make obscure the spirit of the present disclosure.

When it is said that a component is "transferred" "connected", "contacted" or "pressurized" to another component, it should be understood that the former component may be directly transferred, connected, contacted or pressurized to the latter component or a third component may be interposed between the two components.

Specific terms used in the present application are used simply to describe specific embodiments without limiting the disclosure. An expression used in the singular encompasses the expression of the plural, unless it has a clearly different meaning in the context.

Figure 1:
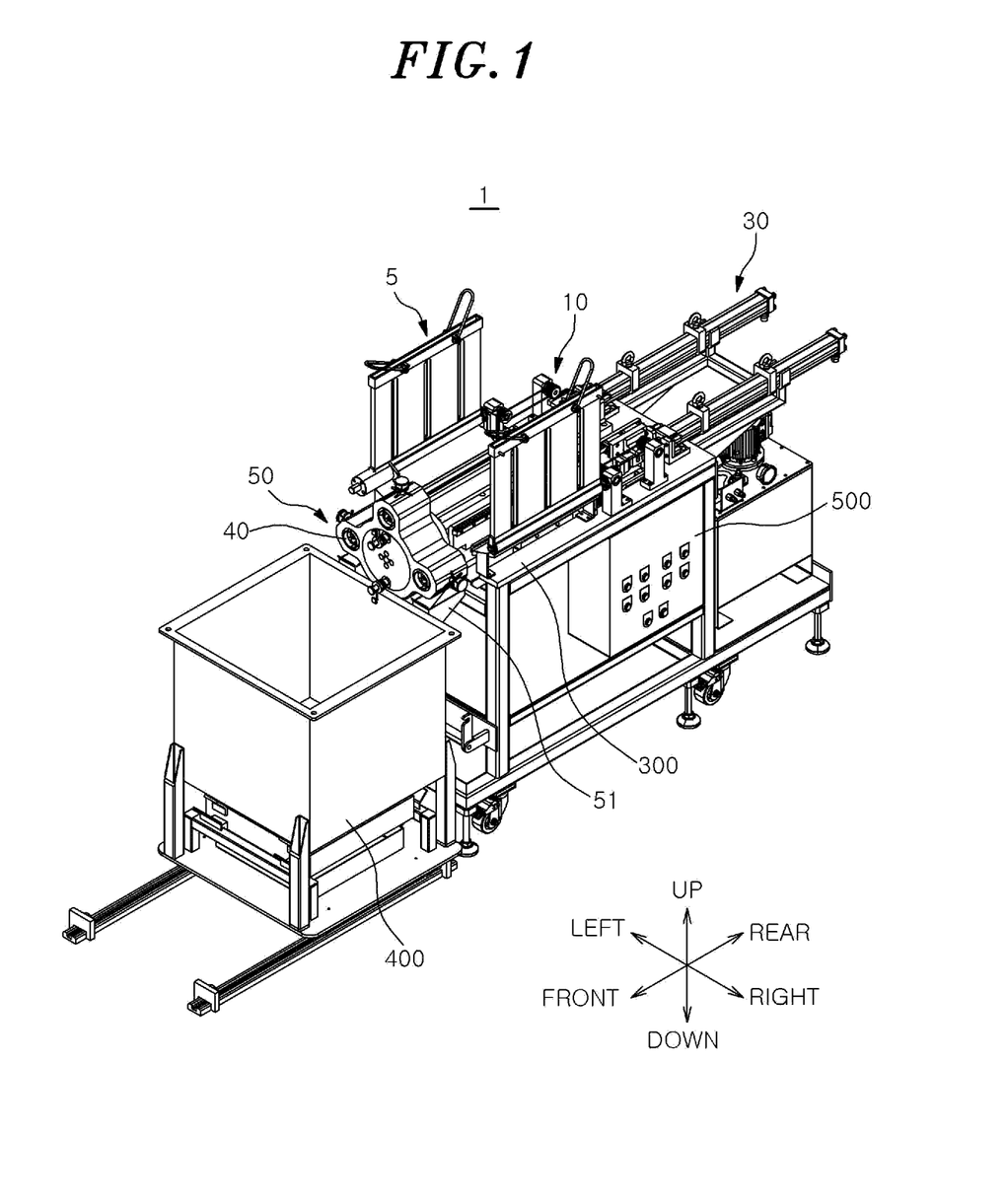
FIG. 1 is a perspective view of a mechanical decladder for a spent nuclear fuel rod-cut according to an embodiment of the present disclosure.
Figure 2:
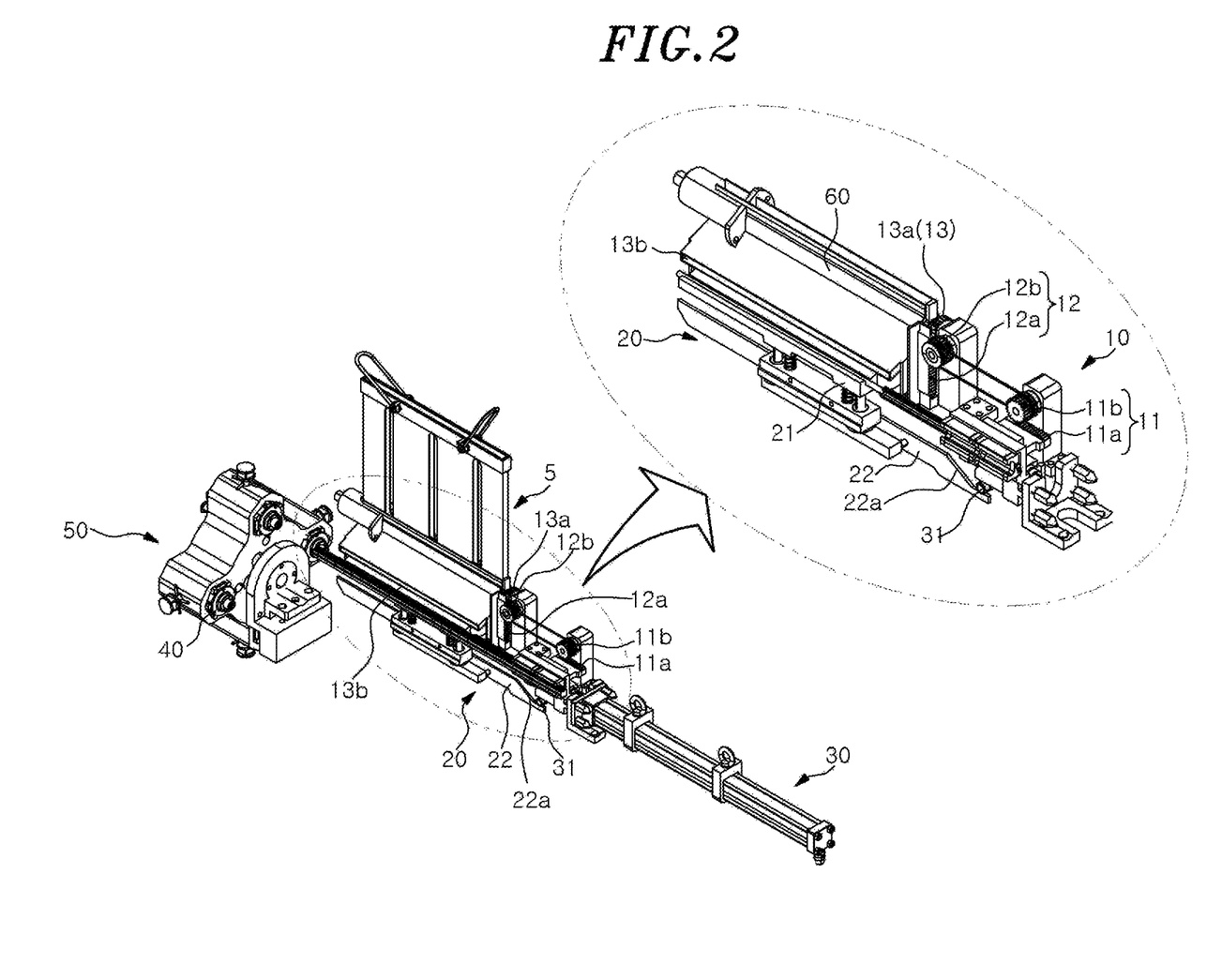
FIG. 2 is a perspective view of a main portion of a mechanical decladder for a spent nuclear fuel rod-cut according to the embodiment of the present disclosure.
Figure 3:
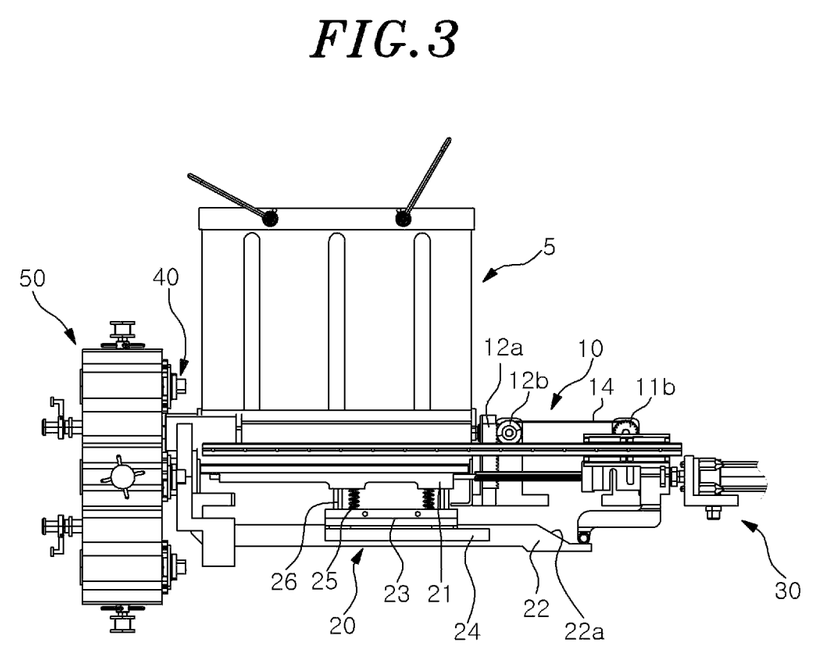
FIG. 3 is a side view of the main portion of the mechanical decladder for the spent nuclear fuel rod-cut according to an embodiment of the present disclosure.

Hereinafter, a mechanical decladder for a spent nuclear fuel rod-cut according to an embodiment of the present disclosure will be described with reference to FIGS. 1 to 3. Further, a moving direction of a hydraulic cylinder module described later is defined as a front and rear direction, and embodiments of the present disclosure will be described with reference to front and rear, left and right, and up and down directions indicated in FIG. 1.

A mechanical decladder 1 for the spent nuclear fuel rod-cut includes a basket 5 into which a plurality of spent nuclear fuel rod-cuts (hereinafter, simply referred to as "fuel rod-cut") are loaded, an opening and closing unit 10 configured to open and close a lower end outlet of the basket 5, a supporter 20 on which the fuel rod-cut discharged from the outlet of the basket is seated, a hydraulic cylinder module 30 configured to push and move the fuel rod-cut seated on the supporter 20, a cutting module 40 for cutting a cladding tube of the fuel rod-cut that is moved forward by the hydraulic cylinder module 30 to separate it into hull pieces and pellets, a rotatable housing module 50 which accommodates a plurality of the cutting modules 40 so that the cutting modules 40 can be alternately used, a support frame 300 for supporting the above components, and a control unit 500 for controlling each of the components.

The hydraulic cylinder module 30 is reciprocated between a pressing position and a standby position in the front and rear direction of the mechanical decladder 1. When the hydraulic cylinder module 30 is in the pressing position, an extrusion pin of the hydraulic cylinder module 30 is operated to protrude in one direction to push and move the fuel rod-cut seated on the supporter 20 to pass it through the cutting module 40. Herein, the direction in which the hydraulic cylinder module 30 moves from the standby position to the pressing position to push the spent nuclear fuel rod-cut may be defined as a front direction, and the direction in which the hydraulic cylinder module 30 moves from the pressing position to the standby position after pushing the spent nuclear fuel rod-cut may be defined as a rear direction.

During the movement of the hydraulic cylinder module toward the standby position, the supporter 20 and the opening and closing unit 10 are operated in conjunction with the movement of the hydraulic cylinder module 30. When the hydraulic cylinder module 30 is in the standby position, a fuel rod-cut seating unit 21 of the supporter 20 is lifted, and the fuel rod-cut disposed at the bottom of the basket 5 is discharged through the outlet of the basket 5 and seated on the supporter 20.

The opening and closing unit 10 is configured to automatically discharge the fuel rod-cut disposed at the bottom of the basket 5 by opening the outlet of the basket 5 in conjunction with a backward movement of the hydraulic cylinder module 30.

Hereinafter, the configuration of the opening and closing unit 10 will be described in detail with reference to FIG. 2.

The opening and closing unit 10 includes a first gear unit 11 coupled to the hydraulic cylinder module 30 and driven in conjunction with the movement of the hydraulic cylinder module 30, a second gear unit 12 driven in conjunction with driving of the first gear unit 11, a third gear unit 13 provided on a side of the basket 5 and driven in conjunction with driving of the second gear unit 12, and an operating member 60 coupled to the third gear unit 13 and operated to open and close the outlet of the basket 5.

The first gear unit 11 has a first rack gear 11a and a first pinion gear 11b meshed with the first rack gear 11a. The second gear unit 12 has a second rack gear 12a and a second pinion gear 12b meshed with one side surface of the second rack gear 12a (for example, a surface facing the rear of the mechanical decladder). The third gear unit 13 has a third pinion gear 13a meshed with the other side surface of the second rack gear 12a (for example, a surface facing the left side of the mechanical decladder).

The first pinion gear 11b and the second pinion gear 12b are connected by a belt 14 so that the rotation of the first pinion gear 11b is delivered to the second pinion gear 12b.

The first pinion gear 11b and the second pinion gear 12b are mounted on the support frame 300 to rotate about a rotation axis orthogonal to the moving direction of the hydraulic cylinder module 30.

The second rack gear 12a is mounted on the support frame 300 to move in the up and down direction in accordance with the rotation of the second pinion gear 12b.

The third pinion gear 13a is mounted on a side of the lower end portion of the basket 5 to rotate about a rotation axis extending in a direction parallel to a longitudinal direction of the fuel rod-cut loaded in the basket 5. As the second rack gear 12a moves in the up and down direction, the third pinion gear 13a rotates about a rotation axis extending in a direction parallel to the front and rear direction of the mechanical decladder, and the operating member 60 provided to open and close the outlet of the basket 5 is operated to open and close the outlet of the basket 5.

Hereinafter, with reference to FIG. 2, the operation of the opening and closing unit 10 will be described in more detail.

When the hydraulic cylinder module 30 moves backward to the standby position, the first rack gear 11a coupled to the hydraulic cylinder module 30 is also moved backward in a horizontal direction. When the first rack gear 11a is moved backward in the horizontal direction, the first pinion gear 11b meshed with the first rack gear 11a is rotated about a rotation axis thereof (counterclockwise direction when viewed from the right side of the mechanical decladder). When the first pinion gear 11b is rotated, the second pinion gear 12b connected to the first pinion gear 11b by the belt is rotated about a rotation axis thereof in the same direction, whereby the second rack gear 12a meshed with the second pinion gear 12b is moved downward. In this case, the third pinion gear 13a meshed with the other side surface of the second rack gear 12a is rotated about the rotation axis thereof (counterclockwise direction when viewed from the rear direction of the mechanical decladder), and the operating member 60 which blocks the outlet of the basket 5 is driven with the rotation of the third pinion gear 13a to open the outlet of the basket 5, so that the fuel rod-cut disposed at bottom of the basket 5 is discharged through the outlet, while fuel rod-cuts having been disposed just above the discharged fuel rod-cut are prevented from being discharged.

The fuel rod-cut discharged through the outlet of the basket 5 is seated on the fuel rod-cut seating unit 21 of the supporter 20 in a lifted position as described later.

Hereinafter, the configurations of the supporter 20, the hydraulic cylinder module 30 and the rotatable housing module 50 will be described with reference to FIGS. 2 and 3.

The supporter 20 includes a fuel rod-cut seating unit 21 on which one of the fuel rod-cuts loaded on the basket 5 is seated, a support member 23 provided at a lower side of the fuel rod-cut seating unit 21 and fixed to the support frame 300, a movable member 24 provided at a lower side of the support member 23 and coupled to the fuel rod-cut seating unit 21, a movable plate 22 coupled to the movable member 24, and a plurality of elastic members 25 (for example, springs) provided between the fuel rod-cut seating unit 21 and the support member 23. The movable plate 22 has an inclined surface 22a.

The fuel rod-cut seating unit 21 and the movable member 24 may be coupled to each other via a plurality of connection portions 26 (for example, two) extending through the support member 23.

The fuel rod-cut seating unit 21 is pressed upward by the elastic member 25 provided between the fuel rod-cut seating unit 21 and the support member 23. As described later, when a roller 31 of the hydraulic cylinder module 30 moves forward and contacts the inclined surface 22a of the movable plate 22 and then moves forward along the inclined surface 22a, the movable plate 22 is moved downward. Accordingly, the fuel rod-cut seating unit 21 is moved downward against a spring force of the elastic member 25, so that the fuel rod-cut seated on the fuel rod-cut seating unit 21 is placed at a position corresponding to an inlet of the cutting module 40.

The hydraulic cylinder module 30 includes an extrusion pin (not shown). A front end of the extrusion pin is configured to be coupled to the first rack gear 11a to press the fuel rod-cut loaded in the fuel rod-cut seating unit 21 of the supporter 20 into the cutting module 40. Since the configuration of the extrusion pin for pressing the fuel rod-cut is a known technique, a detailed description thereof will be omitted.

The rotatable housing module 50 is arranged at a front side of the supporter 20. In the embodiment, the rotatable housing module 50 is configured to accommodate four cutting modules 40, but the present disclosure is not limited thereto and may be configured to accommodate two, three or five or more cutting modules 40.

In the embodiment, the basket 5, the supporter 20, the opening and closing unit 10, and the hydraulic cylinder module 30 are provided in the left and right sides of the mechanical decladder 1.

The rotatable housing module 50 may be installed on the support frame 300 to be rotatable about a rotation axis thereof. In addition, the rotatable housing module 50 may accommodate a plurality of cutting modules 40 (for example, four) arranged along the rotation direction about the rotation axis. Further, by rotating the rotatable housing module 50, it is possible to replace the cutting module 40 used in cutting the fuel rod-cut from the plurality of cutting modules 40. For example, the rotatable housing module 50 may be configured to place two cutting modules 40 among the plurality of cutting modules 40 to correspond to the respective supporters 20 in the front and rear direction of the mechanical decladder (that is, in a slitting direction of the fuel rod-cut). When the replacement of the cutting module 40 is required, the rotatable housing module 50 is rotated by, e.g., 90 degrees so that the unused cutting module 40 can be placed at a position (operating position) corresponding to the supporter 20 in the front and rear direction of the mechanical decladder (i.e., in the slitting direction of the fuel rod-cut). With such configuration, it is possible to easily replace the cutting module 40, thereby the durability of the cutting module 40 can be improved.

That is, when a temperature of a blade 41, which is described later, inside the cutting module 40 is increased by the use of the cutting module 40 for a long periods, the housing module 50 rotates so that the unused cutting module is placed in the operating position. By alternately using the cutting modules 40 in this way, it is possible to prevent the temperature of the blade 41 from being excessively increased, thereby the durability life of the blade 41 can be increased.

The front side of the rotatable housing module 50 is provided with a collecting box 400 for collecting hull pieces and pellets of the cladding tube cut by the cutting module 40.

Figure 4A:
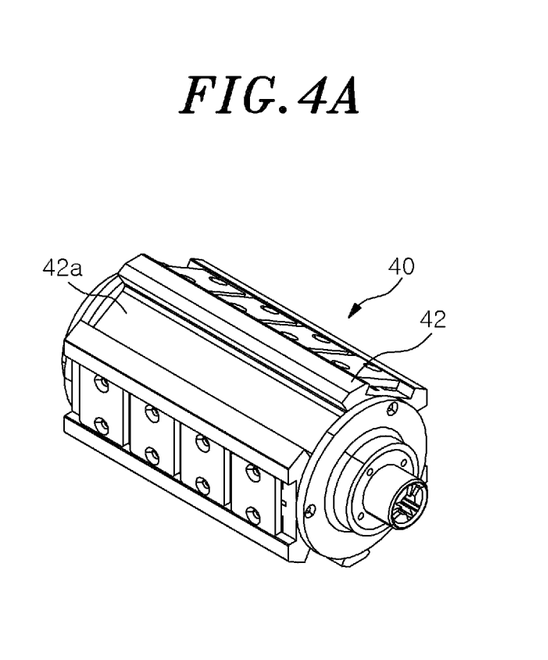
FIGS. 4A and 4B are a perspective view and a cross-sectional view of a cutting module of the mechanical decladder for the spent nuclear fuel rod-cut according to the embodiment of the present disclosure.
Figure 4B:
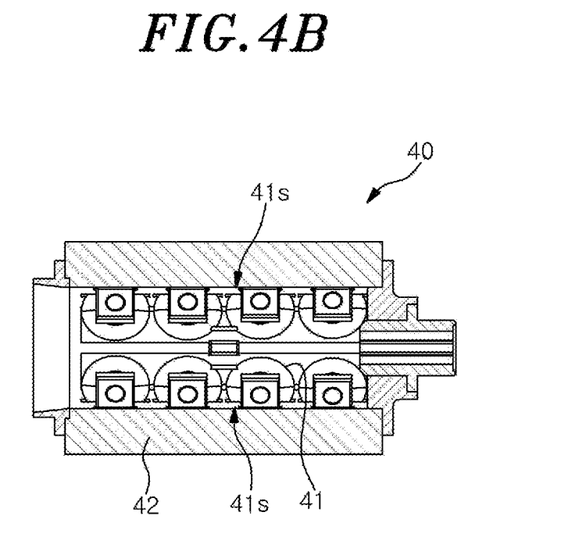

Hereinafter, the configuration of the cutting module 40 will be described with reference to FIGS. 4A and 4B.

The cutting module 40 can separate the fuel rod-cut moved forward by the hydraulic cylinder module 30 into hull pieces and pellets by cutting the cladding tube of the fuel rod-cut. The cutting module 40 includes a plurality of blade sets 41s and each of which has a plurality of blades (e.g., four in the embodiment). The blade sets 41s are arranged at a predetermined interval in a circumferential direction to cut the cladding tube of the fuel rod-cut which passes through the cutting module 40. For example, the plurality of blade sets 41s may be three and arranged at intervals of 120 degrees. Since the configuration of such a cutting module 40 is a known technique, a detailed description thereof will be omitted.

According to the embodiment of the present disclosure, an opening 42a is formed in a casing 42 of the cutting module 40 so that debris accumulated in the cutting module 40 is discharged downward through the opening 42a and collected in the collecting box 400 by a guide member 51 provided in a lower side of the opening 42a.

Hereinafter, the operation of the supporter 20 on which the fuel rod-cuts are seated and the hydraulic cylinder module 30 that presses the fuel rod-cuts seated on the supporter 20 into the cutting module 40 will be described with reference to FIGS. 1 to 3.

The basket 5 containing the spent nuclear fuel rod-cuts is mounted to the mechanical decladder 1 by a crane and a master slave manipulator (MSM). As the hydraulic cylinder module 30 is moved backward to the standby position, the fuel rod-cut seating unit 21 of the supporter 20 is lifted by a spring force of the elastic member 25 and positioned close to a fuel rod-cut feeding opening 13b.

In this case, as described above, as the hydraulic cylinder module 30 is moved backward to the standby position, the opening and closing unit 10 is operated so that the fuel rod-cut disposed at the bottom of the basket 5 is seated on the fuel rod-cut seating unit 21 of the supporter 20 via the fuel rod-cut feeding opening 13b. As such, since the fuel rod-cut is loaded on the fuel rod-cut seating unit 21 of the supporter 20 while the fuel rod-cut seating unit 21 of the supporter 20 is lifted and positioned close to the fuel rod-cut feeding opening 13b, the impact on the fuel rod-cut during the loading can be alleviated.

When the fuel rod is loaded on the fuel rod-cut seating unit 21 of the supporter 20, the hydraulic cylinder module 30 moves forward to the pressing position. At this time, the roller 31 provided in a lower portion of the hydraulic cylinder module 30 contacts the inclined surface 22a of the movable plate 22 of the supporter 20, and then, when the hydraulic cylinder module 30 continues to move forward in a horizontal direction, the movable plate 22 moves downward while the roller 31 moves along the inclined surface 22a of the movable plate 22. In this state, the fuel rod-cut seating unit 21 of the supporter 20 along with the movable plate 22 descends to a position where the fuel rod-cut is aligned with the inlet of the cutting module 40 against the spring force of the spring. In this state, the extrusion pin of the hydraulic cylinder module 30, the fuel rod-cut, and the inlet of the cutting module 40 are aligned in the horizontal direction.

Then, the extrusion pin of the hydraulic cylinder module 30 is advanced to press the fuel rod-cut seated on the fuel rod-cut seating unit 21 to push it into the cutting module 40. The pressed fuel rod-cut is separated into hull pieces and pellets of the cladding tube while passing through the cutting module 40.

The separated hull pieces and pellets are collected in the collecting box 400. Since the collecting box 400 is configured to have three stages consisting of the mesh of 7 mm size, the mesh of 5 mm size and the mesh of 1 mm size in order from the top, the hull pieces and pellets are separated by size of the mesh as the collecting box 400 vibrates. The hull pieces and pellets that pass through the bottom mesh of 1 mm size are put into a container and delivered to a recovering process.

Pursuant to the mechanical decladder 1 for the spent nuclear fuel rod-cut according to the embodiment of the present disclosure, the fuel rod-cuts in the basket 5 can be continuously loaded on the supporter 20 in conjunction with the operation of the hydraulic cylinder module 30. Further, since the cutting module 40 can be used alternately by rotating the rotatable housing module 50, it is possible to improve the durability of the blades 41 inside the cutting module 40. In addition, the opening 42a may be provided in the casing 42 of the cutting module 40 to prevent debris from accumulating in the cutting module 40.

The control unit 500 can control the operation and the driving of the opening and closing unit 10, the hydraulic cylinder module 30, the cutting module 40, and the rotatable housing module 50. The control unit 500 may be implemented by a processing device including a microprocessor. The implementation manner is obvious to those skilled in the art, and thus a detailed description thereof will be omitted.

While the present disclosure has been shown and described with respect to the embodiments, it will be understood by those skilled in the art that various changes and modifications may be made without departing from the scope of the present disclosure as defined in the following claims.

CROSS-REFERENCE TO RELATED APPLICATION

This application claims priority to Korean Patent Application No. 10-2019-0047985, filed on Apr. 24, 2019, the entire contents of which are hereby incorporated herein by reference.

What is claimed is:

1. A mechanical decladder for a nuclear fuel rod-cut, comprising:
an opening and closing unit configured to open and close an outlet of a basket into which the nuclear fuel rod-cut is loaded;
a supporter on which the nuclear fuel rod-cut discharged from the outlet of the basket is seated;
a hydraulic cylinder module configured to move the nuclear fuel rod-cut seated on the supporter; and
a cutting module for slitting the nuclear fuel rod-cut while the nuclear fuel rod-cut is being moved by the hydraulic cylinder module,
wherein the opening and closing unit opens and closes the outlet of the basket in conjunction with a movement of the hydraulic cylinder module.

2. A mechanical decladder for a nuclear fuel rod-cut, comprising:
an opening and closing unit configured to open and close an outlet of a basket into which the nuclear fuel rod-cut is loaded;
a supporter on which the nuclear fuel rod-cut discharged from the outlet of the basket is seated;
a hydraulic cylinder module configured to move the nuclear fuel rod-cut seated on the supporter;
a plurality of cutting modules for slitting the nuclear fuel rod-cut while the nuclear fuel rod-cut is being moved by the hydraulic cylinder module; and
a rotatable housing module to which the plurality of the cutting modules are mounted, the rotatable housing module being rotatable about a rotation axis thereof,
wherein the opening and closing unit opens and closes the outlet of the basket in conjunction with a movement of the hydraulic cylinder module, and
wherein a part of the plurality of the cutting modules is placed in an operating position corresponding to the supporter and the hydraulic cylinder module in a cutting direction of the nuclear fuel rod-cut by a rotation of the rotatable housing module.

3. A mechanical decladder for a nuclear fuel rod-cut, comprising:
an opening and closing unit configured to open and close an outlet of a basket into which the nuclear fuel rod-cut is loaded;
a supporter on which the nuclear fuel rod-cut discharged from the outlet of the basket is seated;
a hydraulic cylinder module configured to move the nuclear fuel rod-cut seated on the supporter;
a plurality of cutting modules for slitting the nuclear fuel rod-cut while the nuclear fuel rod-cut is being moved by the hydraulic cylinder module; and
a rotatable housing module to which the plurality of the cutting modules are mounted, the rotatable housing module being rotatable about a rotation axis thereof,
wherein the opening and closing unit opens and closes the outlet of the basket in conjunction with a movement of the hydraulic cylinder module,
wherein a part of the plurality of the cutting modules is placed in an operating position corresponding to the supporter and the hydraulic cylinder module in a cutting direction of the nuclear fuel rod-cut by a rotation of the rotatable housing module,
wherein a casing of at least one of the cutting modules has an opening therein, and
wherein the opening in the casing is placed downward of blades when the at least one of the cutting modules is placed in the operating position.

4. The mechanical decladder of claim 3, wherein the opening and closing unit includes:
a first gear unit driven in conjunction with the movement of the hydraulic cylinder module;
a second gear unit driven in conjunction with driving of the first gear unit; and
a third gear unit provided at a side of the basket and driven in conjunction with driving of the second gear unit.

5. The mechanical decladder of claim 4, wherein the first gear unit includes a first rack gear and a first pinion gear meshed with the first rack gear,
the second gear unit includes a second rack gear and a second pinion gear meshed with the second rack gear,
the first pinion gear and the second pinion gear are coupled by a belt, and
the third gear unit includes a third pinion gear meshed with the second rack gear.

6. The mechanical decladder of claim 5, further including:
a support frame for supporting the opening and closing unit, the supporter, the hydraulic cylinder module, and the at least one of the cutting modules,
wherein the first rack gear is coupled to the hydraulic cylinder module and moved together with the hydraulic cylinder module,
the first pinion gear and the second pinion gear are mounted on the support frame and are configured to rotate about a first rotation axis orthogonal to a moving direction of the hydraulic cylinder module, the second rack gear is mounted on the support frame to be movable in a vertical direction, and is moved in the vertical direction in accordance with the rotation of the second pinion gear, and the third pinion gear is mounted at a side surface of a lower end portion of the basket to rotate about a second rotation axis extending along a longitudinal direction of the nuclear fuel rod-cut loaded in the basket, wherein as the second rack gear moves in the vertical direction, the third pinion gear is rotated about the rotation axis extending along the moving direction of the hydraulic cylinder module so that an operating member is operated to open and close the outlet of the basket.

7. The mechanical decladder of claim 1, wherein the supporter includes:
- a fuel rod-cut seating unit in which one of spent nuclear fuel rod-cuts loaded in the basket is loaded;
- a support member provided at a lower side of the fuel rod-cut seating unit;
- a movable member provided at a lower side of the support member and coupled to the fuel rod-cut seating unit;
- a movable plate coupled to the movable member and having an inclined surface; and
- an elastic member provided between the fuel rod-cut seating unit and the support member,
- wherein the elastic member presses the fuel rod-cut seating unit upward, and
- wherein, during a forward movement of the hydraulic cylinder module, a roller of the hydraulic cylinder module presses the movable plate downward while moving in contact with the inclined surface of the movable plate.

8. The mechanical decladder of claim 2, wherein the supporter includes:
- a fuel rod-cut seating unit in which one of spent nuclear fuel rod-cuts loaded in the basket is loaded;
- a support member provided at a lower side of the fuel rod-cut seating unit;
- a movable member provided at a lower side of the support member and coupled to the fuel rod-cut seating unit;
- a movable plate coupled to the movable member and having an inclined surface; and
- an elastic member provided between the fuel rod-cut seating unit and the support member,
- wherein the elastic member presses the fuel rod-cut seating unit upward, and
- wherein, during a forward movement of the hydraulic cylinder module, a roller of the hydraulic cylinder module presses the movable plate downward while moving in contact with the inclined surface of the movable plate.

9. The mechanical decladder of claim 3, wherein the supporter includes:
- a fuel rod-cut seating unit in which one of spent nuclear fuel rod-cuts loaded in the basket is loaded;
- a support member provided at a lower side of the fuel rod-cut seating unit;
- a movable member provided at a lower side of the support member and coupled to the fuel rod-cut seating unit;
- a movable plate coupled to the movable member and having an inclined surface; and
- an elastic member provided between the fuel rod-cut seating unit and the support member,
- wherein the elastic member presses the fuel rod-cut seating unit upward, and
- wherein, during a forward movement of the hydraulic cylinder module, a roller of the hydraulic cylinder module presses the movable plate downward while moving in contact with the inclined surface of the movable plate.

\* \* \* \* \*